United States Patent [19]

Paap et al.

[11] 3,925,659
[45] Dec. 9, 1975

[54] INELASTIC GAMMA RAY LOGGING SYSTEM

[75] Inventors: Hans J. Paap; Hubert D. Scott, both of Houston, Tex.

[73] Assignee: Texaco Inc., New York, N.Y.

[22] Filed: Mar. 23, 1973

[21] Appl. No.: 344,304

[52] U.S. Cl. .......................... 250/270; 252/301.2 C
[51] Int. Cl. .............................................. G01t 1/20
[58] Field of Search ........... 250/270, 301, 262, 269, 250/361, 362; 252/301.2 C

[56] References Cited
UNITED STATES PATENTS

| | | | |
|---|---|---|---|
| 2,714,169 | 7/1955 | Armistead | 250/261 |
| 3,139,528 | 6/1964 | Johnson | 250/270 |
| 3,691,378 | 9/1972 | Hopkinson et al. | 250/270 |
| 3,780,301 | 12/1973 | Smith, Jr. et al. | 250/301 |

Primary Examiner—James W. Lawrence
Assistant Examiner—Davis L. Willis
Attorney, Agent, or Firm—T. H. Whaley; C. G. Ries; William J. Beard

[57] ABSTRACT

An illustrative embodiment of the invention includes a system for providing inelastic neutron gamma ray measurements in a well borehole. A pulsed neutron source is used to irradiate earth formations in the vicinity of the borehole with 14 MEV neutrons. Gamma rays resulting from the inelastic scattering of these fast neutrons are detected by an encapsulated liquid scintillator used in conjunction with a photomultiplier. The resulting representative voltage pulses are input to pulse height analyzing apparatus having energy windows located to embrace the Compton distributions associated with calcium, silicon, oxygen and carbon. The number of counts occurring in each of these energy regions may then be interpreted in terms of quantities of interest with respect to the formations in the borehole vicinity.

10 Claims, 3 Drawing Figures

INELASTIC GAMMA RAY LOGGING SYSTEM

BACKGROUND OF THE INVENTION

This invention relates to radiological well logging apparatus for investigating the characteristics of subsurface earth formations traversed by a borehole. More particularly, the invention relates to improved apparatus for inelastic neutron gamma ray well logging techniques.

It is well known that oil and gas are more likely to be found in commercially recoverable quantities from those earth formations which are relatively porous and permeable than in more highly consolidated earth formations. It is also known that oil or gas producing formations may be located by passing a neutron source through the borehole and measuring the intensity of secondary gamma ray radiation developing from neutron irradiation as a function of borehole depth.

In particular, the chlorine nucleus which has a very high thermal neutron capture cross section (moreso than that of the nuclei of other rather commonly found elements) is a good indicator of the location of salt water. Thus, limestone or sandstone layers filled with salt water will have a greater macroscopic thermal neutron capture cross section than an oil saturated layer. When combined with other porosity information oil can thus be detected. This neutron capture cross section difference has been observed in the past by measuring either chlorine capture gamma rays or the lifetime or decay constant of the thermal neutron population in the layer in question.

Improvements in the detection of petroleum containing earth formations have been made by the observation of the scattering of fast neutrons in an inelastic manner by the nuclei of earth materials surrounding a well borehole. For example, in copending patent application, Ser. No. 182,036, filed Sept. 20, 1971 entitled "Improved Pulsed Neutron Logging Systems for Detecting Gas Zones" which is assigned to the assignee of the present invention, inelastic neutron scattering techniques wherein the carbon/oxygen ratio and the silicon/calcium ratio of gamma rays produced by the inelastic scattering of fast neutrons from earth formation materials surrounding the well bore has been utilized in order to distinguish gas bearing and petroleum bearing earth formations from fresh water saturated limestone formations.

It has also been proposed in the prior art to make a measurement of at least a portion of the gamma ray energy spectrum due to inelastic neutron scattering events from neutron irradiated earth formations. Carbon and oxygen have significant inelastic scattering cross sections while having relatively small capture cross sections for fast neutrons. Thus, the carbon and oxygen nuclei in the earth formations surrounding the borehole will engage in appreciable inelastic scattering interactions with bombarding fast neutrons. The gamma radiation resulting from these inelastic scattering interactions will be referred to henceforth as inelastic gamma rays. This approach has been limited in the past to some extent because the inelastic scattering cross section for carbon and oxygen only become appreciable if relatively high energy neutrons are available to provide the interaction. It has heretofore been difficult to provide sufficient quantities of energetic neutrons to reliably perform this type of well log. The development of improved pulsed neutron generators has made possible the measurement of the inelastic scattering gamma ray energy spectrum from relatively high energy neutron irradiated earth formations.

While the system of the aforementioned copending patent application has proved to be very useful, problems are sometimes encountered due to the loss in energy resolution caused by pulse pile-up in the system electronics. Pulse pile-up results from the fact that a logging sytem including the electronic circuits and well logging cable thereof has the capability to effectively count at only a finite instantaneous counting rate. In this regard, the neutron source to gamma ray detector spacing becomes particularly critical in regulating count rate so as to not exceed the finite instantaneous count rate limitation of the system for brief intervals and thus exceed the resolution power of the system. In the aforementioned copending application optimum source to detector spacings and pulse repetition rates are provided which provide a maximum number of total counts while not exceeding the instantaneous count rate limitation of the system. It is, however, desirable to achieve the largest possible total count within the limitation of the instantaneous counting rate system limitations caused by the pulse pile-up effect. Increasing the pulse repetition rate and simultaneously decreasing the burst width of the pulsed neutron source while optimizing the source to detector spacing for a particular tool geometry can yield excellent results as in the case of the above-referenced copending patent application while using conventional sodium iodide thallium doped crystal scintillation detectors in order to detect the inelastic gamma rays.

In spite of these efforts a proportion of the gamma rays counted by the detector are induced within the detector material itself by fast neutron capture and the consequent production of gamma radiation by materials within the detector crystal. Another cause of pulse pile-up in the use of doped sodium iodide crystal detectors is the relatively long recovery time constant of this type of detector. This is the time required for one scintillation produced in the crystal to die away sufficiently for a second separate scintillation to be observable and not confused with the first scintillation. In the case of doped sodium iodide crystal scintillators this time constant typically is about $0.23 \times 10^{-6}$ seconds or 0.23 microseconds.

Organic plastic or liquid scintillators may be used to provide much faster delay constants in order to overcome this latter problem. For example, a plastic scintillator material is commercially available having a decay constant as low as $2.2 \times 10^{-9}$ seconds (2.2 nanoseconds) and an organic liquid scintillator having a decay time of $2.6 \times 10^{-9}$ seconds (2.6 nanoseconds) is also commercially available. While these materials have excellent decay time characteristics, they also have a high percentage of hydrogen in their makeup due to their organic nature. This hydrogen (being an excellent moderator for fast neutrons) makes these organic scintillator materials very sensitive to direct neutron irradiation from the neutron source in the well logging tool and thus can provide a large spurious and undesirable background radiation.

Accordingly, it an an object of the present invention to provide an inelastic neutron scattering well logging measurement system having an improved counting capability by the use of an improved scintillating detector.

Another object of the present invention is to provide improved pulsed neutron inelastic gamma ray well logging systems utilizing a liquid scintillation detector which is relatively insensitive to neutrons.

A still further object of the present invention is to provide a pulsed neutron well logging system which has a higher instantaneous inelastic gamma ray counting capability than previously known inelastic neutron scattering well logging systems and is relatively insensitive to neutrons.

The above and other objects, features and advantages of the present invention are provided in a pulsed neutron well logging system. Time dependent gating means isolate the inelastic gamma rays emanating from earth formations surrounding the well borehole. Four energy intervals or windows in the inelastic gamma ray energy spectrum are positioned and their width chosen so that the inelastic gamma rays from carbon, oxygen, silicon and calcium are detected. These gamma rays are detected in the system of the present invention by a liquid scintillation detector which is almost entirely free of hydrogen and which contains hexaflurobenzene $C_6F_6$ as a solvent. This detector has a relatively high gamma ray counting efficiency and a very low neutron interaction efficiency.

The counting rate in each of the aforementioned energy windows is inversely related to the presence of hydrogen in the earth formations surrounding the well borehole. Therefore, an observation in a given zone of counting rates in all windows exceeding certain predetermined levels is indicative of the formation hydrogen index. By then comparing an inelastic carbon/oxygen and silicon/calcium ratios for this zone in an appropriate manner the formation lithology may be differentiated as either predominantly siliceous or predominantly carbonaceous and estimates of the hydrocarbon content of the earth formations may then be made.

The above and other objects, features and advantages of the invention are pointed out with particularity in the appended claims. The present invention is best understood by taking the following detailed description thereof in conjunction with the appended drawings in which:

DESCRIPTION OF THE PREFERRED EMBODIMENTS

Figure 1:
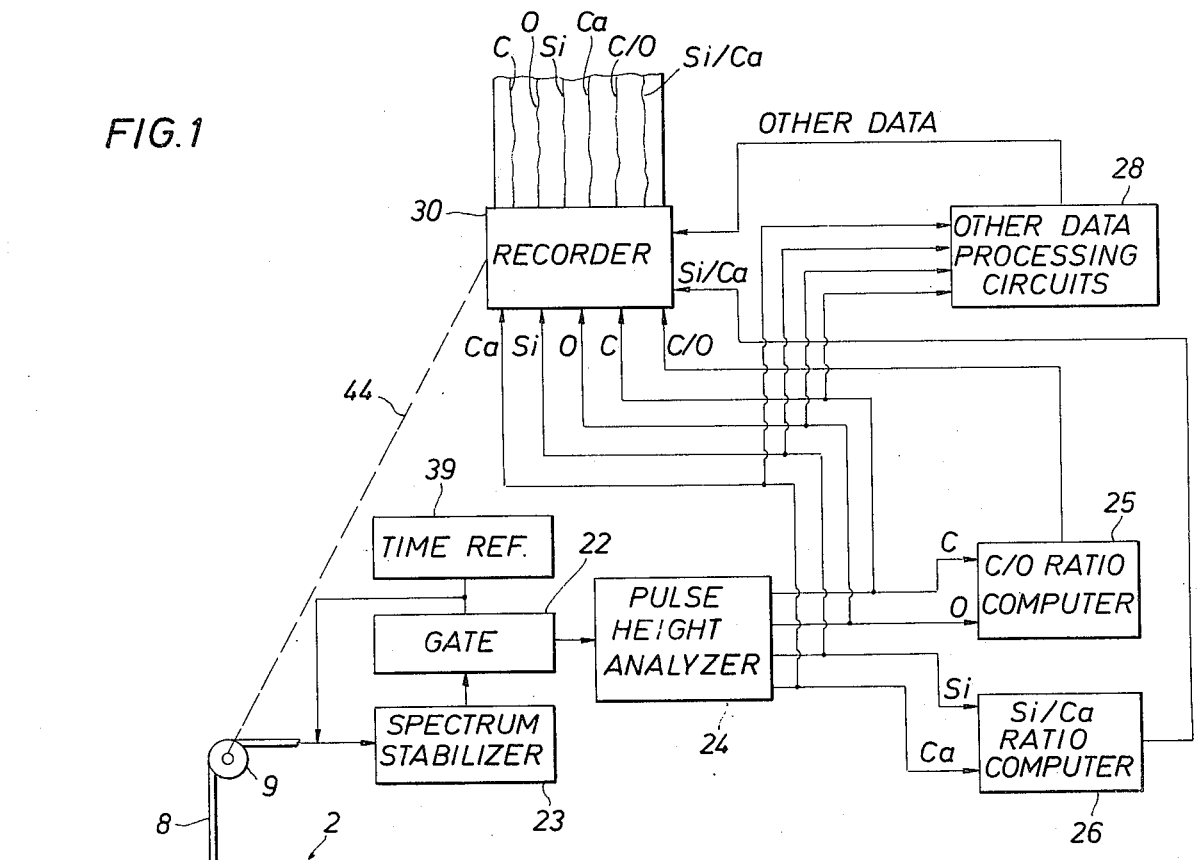
FIG. 1 is an overall schematic block diagram of a well logging system in accordance with the invention.

Referring initially to FIG. 1 there may be seen a simplified, functional representation in the form of a block diagram of well logging apparatus in accordance with the invention. A borehole 2 penetrating earth formation 3 is lined with a steel casing 4 and filled with a well fluid 5. The steel casing 4 is cemented in place by a cement layer 6 which also serves to prevent fluid communication between adjacent producing formations in the earth 3.

The downhole portion of the logging system may be seen to be basically composed of an elongated fluid tight hollow body member or sonde 7 which during the logging operation is passed longitudinally through the casing 4 and is sized for passage therethrough. Surface instrumentation, whose function will be discussed in more detail subsequently, is shown for processing and recording electrical measurements provided by the sonde 7. A well logging cable 8 which passes over a sheave wheel 9 supports the sonde 7 in the borehole and also provides a communication path for electrical signals to and from the surface equipment and the sonde 7. The cable 8 may be of a conventional armored well logging type and may have one or more electrical conductors for transmitting such signals between the sonde 7 and the surface apparatus.

Again referring to FIG. 1 the sonde 7 contains a source of high energy neutrons 11. The neutron source contemplated for use herein is a pulsed neutron source operating from the principle of the deuterium-tritium reaction. However, it will be appreciated by those skilled in the art that other types of pulsed neutron sources may be used if desired.

A suitable radiation detector comprising a photomultiplier tube 10 and a liquid scintillation detector 12 which is optically coupled thereto is provided in the sonde 7 for detecting gamma ray radiation resulting from the inelastic scattering of high energy neutrons by the earth formations 3 surrounding the well borehole 2. A radiation shield 13 of iron, lead, paraffin, or combinations thereof or of other suitable material is interposed between the neutron accelerator 11 and the liquid scintillation detector 12 of the apparatus. The liquid scintillation detector 12 may comprise a bubble free metal container of hexaflurobenzene liquid as a solvent $C_6F_6$. This solvent is almost completely free of hydrogen. A liquid scintillation detector of this type has a relatively high gamma ray efficiency and a very low neutron efficiency. A detector such as the hydrogen free liquid scintillator NE226 which is commercially available from Nuclear Enterprises Limited of Winnipeg, Canada, may be used for this purpose. The properties of a conventional sodium iodide, thallium doped crystal and the NE226 liquid scintillation detector are compared in Table 1 as follows.

| Property | Table 1 NaI(Tl) | Ne226 |
|---|---|---|
| Relative Γ-ray efficiency above 0.5 MEV | 1.0 | 0.25 |
| Relative neutron efficiency | 1.0 | 1/250 |
| Decay constant | $.23 \times 10^{-6}$ sec. | $3.3 \times 10^{-9}$ sec. |

From Table 1 it can be seen that the NE226 detector has a gamma ray to neutron efficiency about 60 times that of a conventional sodium iodide, thallium doped crystal detector. It will also be observed from Table 1 that the decay constant, that is the scintillation light flash intensity decay time of the NE226 detector, is more than 100 times faster than that of a conventional thallium doped sodium iodide crystal detector. Since the instantaneous counting rate of the system is determined to a large degree by this decay time constant, the instantaneous pulse counting rate available from a liquid scintillation detector such as that disclosed is two orders of magnitude faster than that of a conventional crystal. This makes the instantaneous response of the well logging system using an organic liquid scintillator such as NE226 much better than that of the conventional crystal and detectors.

Since the organic liquid scintillator used in the NE226 detector contains elements with a relatively low atomic number, the gamma ray spectra resulting from detection in this type of detector will exhibit a large amount of Compton scattering of the gamma rays produced by the nuclear interactions in the material surrounding the well borehole during their passage through the liquid scintillator. Thus, the gamma ray spectra will exhibit Compton edge effects rather than the marked peak response of the conventional sodium iodide thallium doped crystal detectors. However, by proper placement of the energy windows or gates to be subsequently described, this limitation may be overcome. In any event, the resultant increase in time resolution far outweighs any disadvantages caused by the Compton scattering effects.

Referring again to FIG. 1 a thermal neutron shielding sleeve 15 may be provided as shown around the liquid scintillation detector 12 on either the interior or exterior wall portion of the sonde. Additionally, the thermal neutron shielding disk 16 is interposed between the radiation shielding material 13 and the detector crystal 12 to reduce the probability of thermal neutrons from reaching the detector 12. This shielding material may be comprised of boron or any other suitable material having a high thermal neutron capture cross section. This shielding also serves to reduce the possibility of thermal neutrons which follow a tortuous path and have been slowed by the borehole fluid 5 or the shielding material 13 from reaching the vicinity of the detector and possibly causing neutron activation of the elements comprising the detector housing. This reduces the emission of thermal neutron capture gamma radiation during the time period when the inelastic gamma rays are being observed.

The scintillation detector 12 produces a discrete flash of light whenever a gamma ray passes therethrough and exchanges energy with the fluoreseing material comprising the liquid scintillation detector. The photomultiplier tube 10 generates a current pulse proportional in height to the intensity of each such scintillation which occurs in the liquid scintillation detector 12. The intensity of such scintillations or light flashes is functionally related to the energy of the gamma ray causing the light flash. Thus, a voltage pulse produced by passing the current pulse through a resistor (not shown) has an amplitude functionally related to the energy of the corresponding gamma ray. These voltage pulses produced by the tube 10 comprise a detector signal which is supplied to a linear amplifier 17 via a discriminator 18. The discriminator 18 may be used if desired to discriminate, for example, against low energy background gamma radiation emanating from materials surrounding the well borehole. This discrimination can thus be used to eliminate unwanted pulses which could contribute to pile-up due to the time response of the system electronics and the frequency band pass of the well logging cable.

The neutron accelerator 11 is preferably operated by a pulsing circuit 14 which may be of conventional design as known in the art. The pulsing circuit 14 functions to operate the accelerator 11 in short duration pulses. This circuit may be controlled by timing pulses from a surface timing reference 39 which are communicated over the cable 8 conductors. The timing reference 39 could also be located in the downhole sonde 7 if desired. The timing signals are also supplied to a downhole reference pulser 20. For example, the pulsing circuit 14 could be activated by a timing signal from the time reference 39 to emit a neutron burst of a specified time duration. The frequency of such bursts could then be controlled by the timing reference 39 frequency. In the inelastic neutron scattering measurements contemplated in the present invention it is desirable to use neutron pulses at least as short as about 5 microseconds in duration and which are repeated at intervals of approximately 5,000 to 20,000 times per second.

Figure 2:
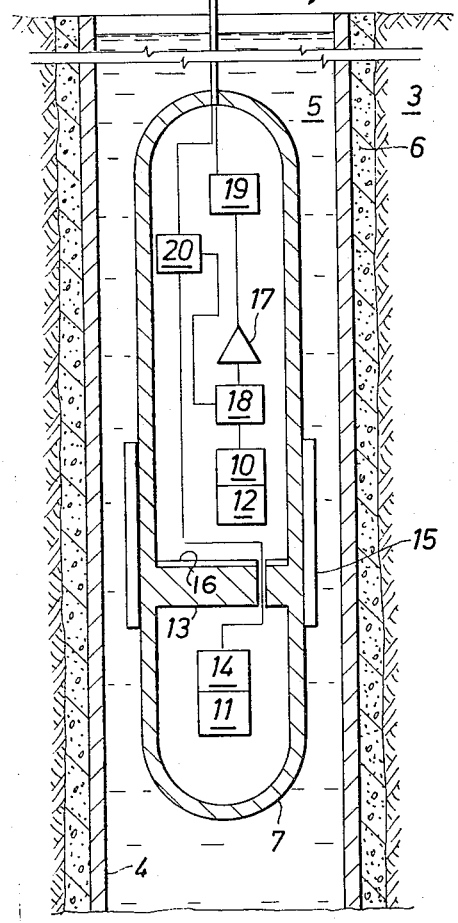
FIG. 2 is a timing diagram showing the relationship of accelerator and detector on times with respect to gamma rays caused by the inelastic scattering of neutrons and thermal neutrons in the vicinity of the borehole.
Figure 2:
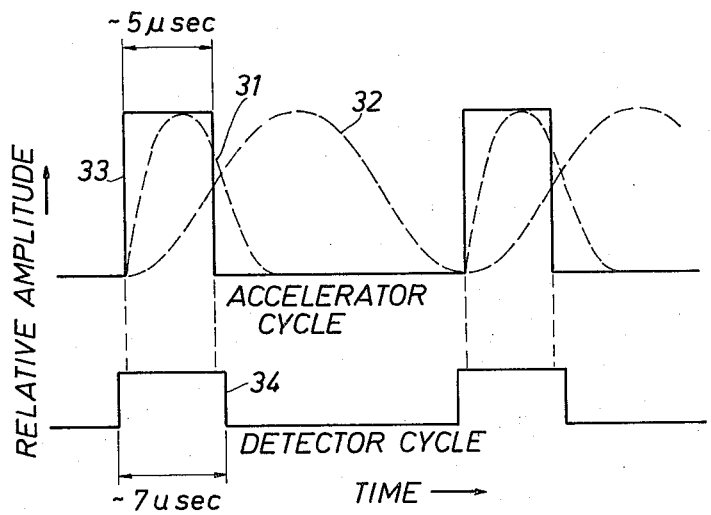

Referring now to FIG. 2 the relative time relationship of the neutron pulses just discussed to the operative portion of the gamma ray detector cycle and to the high energy and thermal neutron populations are shown. The accelerator cycle is represented by the solid curve 33. The inelastic gamma ray population in the vicinity of the liquid scintillator detector 12 is represented by the dashed curve 31. The thermal capture gamma ray population in the vicinity of the liquid scintillation detector 12 is shown by the dotted line curve 32. The operative detector cycle is represented by the separate solid line curve 34.

There is a rapid buildup of the inelastic gamma ray population curve 31 which is essentially present only during the neutron pulse. The thermal capture gamma ray population curve 32 builds up much slower and reaches a peak only after the cessation of the 5 microsecond neutron pulse. In the diagram of FIG. 2 it will be noted that the neutron pulses are spaced sufficiently far apart in time for the thermal neutron population curve 32 to decay to almost zero before the next pulse. However, in general and particularly at the higher pulse repetition rates desirable for optimum counting statistics some neutrons are still extant in the vicinity of the liquid scintillation detector at the time the subsequent neutron pulse occurs. In this case the boron thermal neutron shielding material 15 and disk 16 is particularly adapted for reducing spurious gamma ray detections resulting from this source by rapidly absorbing such thermal neutrons. Here, again, the relatively low neutron counting efficiency of the NE226 detector reduces such spurious background also.

Referring again to FIG. 1 and bearing in mind the timing sequence it will be observed that during the time the neutron accelerator 11 is activated output signals from the photomultiplier tube 10 are conducted via the discriminator 18, linear amplifier 17 to a cable driver circuit 19 which may be of conventional design. A reference signal having a known amplitude is also supplied by pulser 20 to the input of the discriminator 18. This reference pulse provided by the downhole pulser 20 may be utilized and a gain control device or spectrum stabilizer 23 located at the surface to control the gain of the system. This, of course, may be accomplished primarily in the time interval between neutron pulses as the spectrum stabilizer 23 may be supplied with signals from the pulser continuously or in any desired sequence.

Since both the downhole pulse generator 14 and the surface gate 22 which controls the time selection of the data pulses from the downhole sonde are timed with the same timing reference 39, it is apparent that synchronism may be maintained between the surface equipment and the downhole equipment. Thus, the data signals may be gated in such a manner upon their arrival at the surface to select portions thereof for processing which are timed as desired relative to the emission of the neutrons in the manner as described with respect to FIG. 2.

Although not depicted in FIG. 1 it will be understood by those skilled in the art that electrical power may be supplied from a surface power source (not shown) via the well logging cable 8 to the downhole sonde 7. Suitable power supplies (not shown) are provided in the sonde 7 for powering the downhole portion of the equipment.

Output signals from the gate 22 comprise a sequence of count pulses resulting from gamma rays detected by the liquid scintillation detector 12 and photomultiplier tube 10 during the time interval that the neutron accelerator 11 is activated. These pulses comprise data mainly resulting from the excitation of nuclei in the vicinity of the liquid scintillation detector 12 which have been excited by the inelastic scattering of neutrons emitted by the accelerator 11. The inelastic gamma rays are supplied to a pulse height analyzer 24.

Pulse height analyzer 24 may be of conventional design as known in the art and may have, for example, four or more energy channels or divisions corresponding to quantitizations of the pulse height of the input pulses. The pulse height analyzer 24 functions to sort and accumulate a running total of the incoming pulses into a plurality of storage channels based on the height of the incoming pulses. These energy channels are directly related to the energy of the gamma rays causing the pulse in the downhole liquid scintillation detector. The output of the pulse height analyzer 24 in the case of the present invention consists of a number of count pulses occurring in each of the four preselected energy ranges or windows chosen to represent the elements carbon, oxygen, silicon and calcium.

Figure 3:
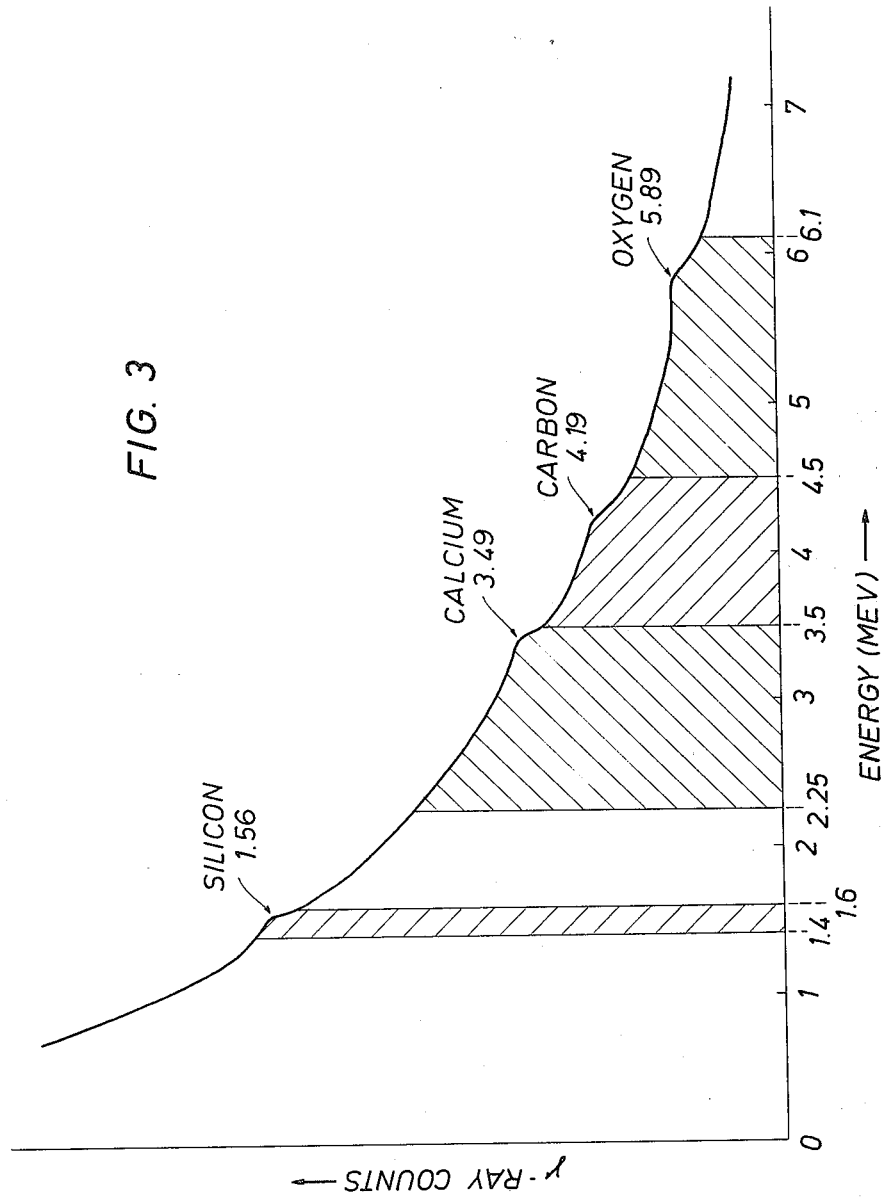
FIG. 3 is a graphical representation of an inelastic neutron gamma ray spectrum using a detector system in accordance with the invention and showing the placement of the four energy windows in the spectrum.

Referring now to FIG. 3 a typical gamma ray energy spectrum produced from the inelastic scattering of fast neutrons by the earth formation materials in the vicinity of the borehole and detected with the liquid scintillator is shown schematically. As previously mentioned, the large amount of Compton scattering of the gamma rays in the liquid scintillator causes a general smearing of the spectrum of FIG. 3. The peak structure generally associated with conventional sodium or cesium iodide doped crystal detectors is nearly all absent. Shown in the spectrum of FIG. 3 in exaggerated form are the "Compton Edges" associated with inelastic gamma rays from oxygen, carbon, calcium and silicon. Also shown in FIG. 3 are the pulse height analyzer 24 (FIG. 1) energy windows chosen to encompass these "edges." The silicon energy window extends from about 1.4 MEV to 1.6 MEV, the calcium energy window extends from 2.25 MEV to 3.5 MEV, the carbon energy window extends from 3.5 MEV to 4.5 MEV and the oxygen energy window extends from 4.5 MEV to 6.1 MEV. These windows encompass the 1.56 MEV silicon, the 3.49 MEV calcium, the 4.19 MEV carbon and the 5.89 MEV oxygen Compton edges respectively. This placement of energy windows thus assures a good count rate from the Compton distribution associated with each of these elements in the material in the vicinity of the borehole.

The number of counts occurring in each of the four energy windows, carbon, oxygen, silicon and calcium during the time interval that the downhole detector signals are supplied to the pulse height analyzer 24 via the gate 22 are output from the pulse height analyzer 24 as four separate digital signals. These signals are supplied to a recorder 30 which is driven as a function of borehole depth either electrically or mechanically by the sheeve wheel 9 as illustrated by the dotted line 44. These four separate digital signals may be thus plotted as a function of borehole depth as illustrated in FIG. 1. Moreover, these four signals may be supplied to other data processing circuits 28 for the determination of water saturation, porosity or other data of interest. In addition the output signals from the pulse height analyzer 24 which occur in the carbon and oxygen energy windows are supplied to a carbon/oxygen ratio computer 25. The carbon/oxygen ratio output of the computer 25 drives one track of the recorder 30 as a function of borehole depth. Also, the analyzer outputs which results from inelastic gamma rays in the silicon and calcium energy windows are supplied to a silicon/calcium ratio computer 26 which computes this ratio and drives yet another track of the recorder 30. Thus, the silicon/calcium ratio is plotted as a function of borehole also. In the present invention at least 6 tracks are used on the recorder 30 to plot carbon, oxygen, silicon, calcium, carbon/oxygen ratio and silicon/calcium ratio as a function of borehole depth.

These data may be used in the manner described in the previously mentioned copending patent application to determine the presence of gas zones and to compute other parameters of interest with regard to the well being logged. Improved counting statistics through the use of the liquid scintillation detector can produce improved results over previously known apparatus.

In summary, the techniques of the present invention include observing individual inelastic gamma ray counting rates in calcium, silicon, oxygen and carbon energy windows together with the carbon/oxygen and silicon/calcium ratios. From these observations well logging parameters of interest may be developed using known techniques.

It will be apparent to those skilled in the art that the disclosed apparatus may make other alternative embodiments apparent to those skilled in the art. It is the aim of the appended claims to cover all such changes and modifications as fall within the true spirit and scope of the invention.

We claim:

1. Apparatus for determining the characteristics of material in the vicinity of a well borehole, comprising:
   a fluid tight hollow body member sized for passage through a well borehole and having situated therein;
   neutron source means for providing a flux of fast neutrons to irradiate materials in the vicinity of the borehole and liquid scintillation detector means comprising a scintillator material disposed in an essentially hydrogen free organic solvent for detecting gamma radiations attributable to the inelastic scattering of fast neutrons from materials in the vicinity of the borehole and for producing voltage pulses functionally related to the energy of the gamma radiations; and
   means for separating said functionally related voltage pulses into a spectrum of corresponding inelastic gamma ray energies and for recording said spectrum of inelastic gamma ray energies.

2. The apparatus of claim 1 wherein said liquid scintillation detector means comprises a scintillator material disposed in a solvent of hexaflurobenzene ($C_6F_6$).

3. The apparatus of claim 1 wherein said neutron source means comprises a pulsed source of 14 MEV neutrons and said means for separating said voltage pulses into a spectrum of corresponding inelastic gamma ray energies includes time gating means for providing said pulses to said separating means substantially coincident in time with the operation of said pulsed neutron source.

4. The apparatus of claim 1 wherein said means for separating said proportional voltage pulses includes pulse height analyzer means having pulse height channels corresponding to at least four energy channels in the inelastic gamma ray energy spectrum between 1 MEV and 8 MEV.

5. The apparatus of claim 4 wherein said at least four energy channels includes energy channels encompassing substantial portions of the Compton distributions associated with calcium, silicon, carbon and oxygen associated with the inelastic scattering of neutrons by these four elements.

6. The apparatus of claim 5 wherein said energy channels extend from approximately 1.4 to 1.6 MEV for silicon, from approximately 2.25 to 3.5 MEV for calcium, from approximately 3.5 to 4.5 MEV for carbon and from approximately 4.5 to 6.1 MEV for oxygen.

7. Apparatus for determining the characteristics of earth formation materials in the vicinity of a well borehole, comprising:

a fluid tight hollow body member sized for passage through a well borehole;

pulsed neutron source means in said body member for repetitively irradiating the earth formations in the borehole vicinity with relatively short duration pulses of fast neutrons;

scintillation detector means comprising a scintillator material disposed in a liquid essentially hydrogen free organic solvent in said body member for detecting gamma radiations attributable to earth formation materials in the vicinity of the borehole and for producing voltage pulses functionally related to the energy thereof;

means for separating said functionally related voltage pulses into a plurality of voltage pulse channels corresponding to a plurality of gamma ray energies; and time gating means for selecting as input to said means for separating said voltage pulses substantially only those pulses occurring during the operative period of said pulsed neutron source.

8. The apparatus of claim 7 wherein said solvent is hexaflurobenzene ($C_6F_6$).

9. The apparatus of claim 7 wherein said means for separating said voltage pulses into a plurality of channels comprises means for separating said voltage pulses into at least four channels corresponding to the energies encompassing substantial portions of the Compton distribution associated with calcium, silicon, carbon and oxygen caused by the inelastic scattering of fast neutrons by these four elements.

10. The apparatus of claim 9 wherein said at least four channels include channels covering the approximate energy ranges of 1.4 to 1.6 MEV for silicon, 2.25 to 3.5 MEV for calcium, 3.5 to 4.5 MEV for carbon and 4.5 to 6.1 MEV for oxygen.

* * * * *